F. E. ROACH.
DENTAL IMPRESSION FLASK OR TRAY.
APPLICATION FILED MAY 20, 1920.
1,367,628.
Patented Feb. 8, 1921.
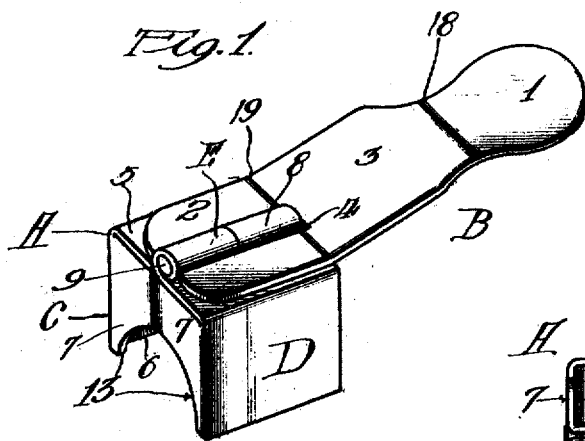
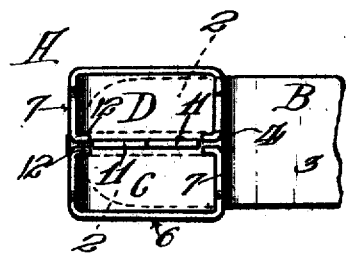
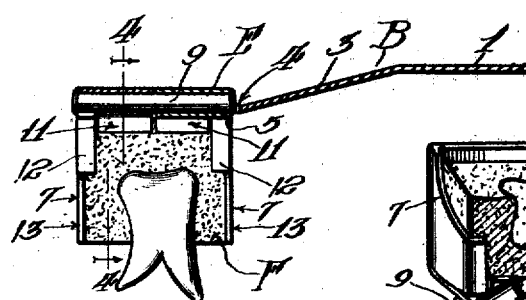
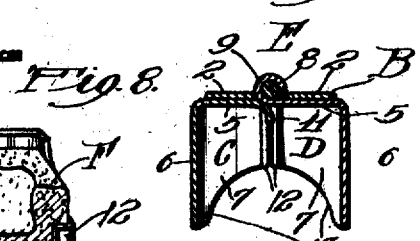
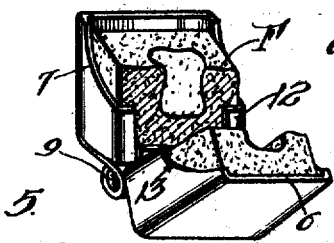
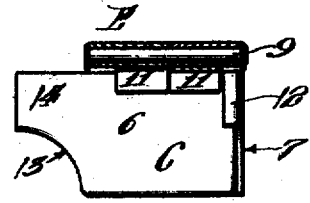
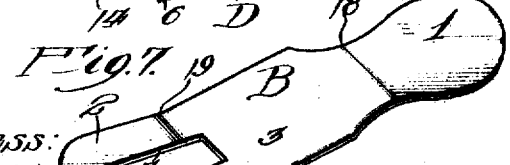
Witness:
Stephen Hilton
B. L. MacGregor
Inventor:
Finis E. Roach.
By Taylor Brown
his attorney

UNITED STATES PATENT OFFICE.

FINIS E. ROACH, OF CHICAGO, ILLINOIS.

DENTAL IMPRESSION FLASK OR TRAY.

1,367,628.  Specification of Letters Patent.  Patented Feb. 8, 1921.

Application filed May 20, 1920. Serial No. 382,940.

*To all whom it may concern:*

Be it known that I, FINIS E. ROACH, a citizen of the United States, residing at Chicago, in the county of Cook and State of Illinois, have invented certain new and useful Improvements in Dental Impression Flasks or Trays, of which the following is a specification, reference being had to the accompanying drawings, and to the reference characters marked thereon, which form a part of this specification.

This invention relates to improvements in dental impression trays and more particularly to a tray adapted to be filled with plastic material for the purpose of taking a mold or impression of a tooth in the mouth of a patient.

In dentistry, it frequently is desirable to obtain a model or cast of a tooth or other formation in the mouth of a patient. In order to obtain such a cast, it is necessary to apply plastic material to the tooth or other object in the mouth to obtain an impression of the same, then remove such plastic material after hardening, and finally to cast a model from the mold thus obtained. In carrying out such a process, several difficulties are encountered. In the first place, due to the inaccessibility of the tooth in the patient's mouth, it is difficult to apply the plastic material or to apply it in sufficient quantity to completely surround the tooth without spilling the same or rubbing it or its container against sensitive parts of the mouth. In the second place, since the tooth frequently is constricted at the neck, it is difficult to remove it from the plastic material after the impression has been obtained, without deforming the molded impression. In the third place, since the plastic material as applied to the tooth is soft, it is difficult to handle the same for the purpose of inserting it into the mouth.

In my improved dental molding tray, I have invented a device which overcomes the objections noted above. With my improved tray it is possible to hold a small quantity of plastic material but sufficient in amount to completely surround the tooth or other object, the impression of which is desired, readily insert such plastic material into the mouth without danger of loss, and without danger of contact with or injury to other parts of the mouth, force the plastic material around the tooth so that a clear, full and distinct impression is obtained, and then remove such plastic material from the tooth without deforming the impression obtained, giving a mold in which a perfect casting may be made.

The objects mentioned above and others will be more readily comprehended as I proceed with my specification.

In that form of device embodying the principles of the present invention, shown in the accompanying drawings:

Figure 1 is a view in perspective of one form of my improved dental tray with its removable handle attached.

Fig. 2 is a top plan view of the device shown in Fig. 1 with a part of the handle broken away.

Fig. 3 is a vertical sectional view of the device shown in Fig. 1, taken centrally and longitudinally of the handle.

Fig. 4 is a vertical sectional view taken in the plane of the line 4—4 of Fig. 3.

Fig. 5 is a plan view of another form of tray, with the handle removed.

Fig. 6 is a vertical sectional view on the line 6—6 of Fig. 5.

Fig. 7 is a plan view of the removable handle used in connection with the different forms of trays.

Fig. 8 is a view in perspective showing the form of tray illustrated in Fig. 1 with the handle removed and the tray opened after an impression of a tooth has been taken.

As shown in said drawings, A indicates in general a tray formed of two hinged halves C and D. B indicates a removable handle adapted to be used in connection with the different forms of trays. F indicates in general, plastic material in the tray in which an impression or mold of a tooth G is taken.

The form of tray A shown in Fig. 1 with the two halves C and D closed as shown in Figs. 1 and 2, is substantially cubical with one side entirely open and two opposite adjacent sides having circular cut away portions as indicated by 13.

The two halves C and D of the tray A, are symmetrical, each being formed by the side face 6, the two end faces 7, 7 (the latter being cut away at 13 as mentioned heretofore), and the top face 5 which latter lies adjacent a hinge E. Each of the faces 5 has two projecting tongues 8 and 11, the longer tongue 8 being bent outwardly in cylindrical shape to form one half of the hinge E and the shorter tongue 11 being bent inwardly for a purpose to be explained hereinafter. The two tongues 8, 8, of the two halves C and D, each bent in cylindrical form, together with the pin or butt 9 which they encircle, form the complete hinge E. Each of the ends 7 of the two halves C and D also has a short inwardly projecting tongue 12 for a purpose to be explained hereinafter.

The removable handle B is formed of a short piece of metal substantially rectangular in shape, slightly bent in opposite directions at 18 and 19 to divide it into three parts, namely the handle part 1, the center or offset part 3 and the grip or lock part 2,— the lock or grip part containing a longitudinal slot 4. The slot 4 is somewhat narrower than the outside diameter of the cylinders formed by the tongues 8, 8, constituting a part of the hinge E, but it is of sufficient width to accommodate such tongues when the part 2 is placed on the faces 5 of the tray as shown in Fig. 1. This position is accomplished by sliding the hinge E into the slot 4 while holding the part 2 in contact with the faces 5, allowing the widest part of the hinge E to lie on the opposite side of the part 2. It is obvious that when in this position the part 2 of the handle B will prevent the two halves C and D of the tray A from swinging open on the hinge E. When the handle B is removed, however, the two halves of the tray may be opened as shown in Fig. 8.

In Figs. 5 and 6 I have shown another form of tray A. This tray resembles the one shown in Fig. 1 except that two of the ends 7 of the two halves are bent outwardly to lie in a plane with the sides 6 as indicated by 14. In this construction the two tongues 12 are omitted from the ends thus bent outwardly.

The purpose of the inwardly bent tongues 11 and 12 is to part or split the impression material when the two halves of the tray A are opened on the hinge E. When an impression of a tooth or other object with an enlarged end or undercut or indentation is taken, it is necessary to so part the impression material in order to permit the removal of the material from contact with the tooth without deforming the impression.

In the operation of my improved device the handle B is attached to the tray A as shown in Fig. 1, and the tray is filled with a plastic material F, of any desired kind. The operator then holds the device by the handle B, inserts the tray into the mouth and presses the same over the tooth or other object of which an impression is desired. If necessary, the impression material F may then be tamped into the tray in order to completely surround the tooth or other object. I have shown the device in this position in Fig. 3, in which G indicates the tooth of which an impression is desired. The handle B is then removed from the tray A by withdrawing the handle, the slot 4 readily sliding away from contact with the hinge E. The two halves C and D of the tray A may then be swung open or apart on the hinge E, the tongues 12 and 11 on the respective halves operating to cause the impression material F to part or split, thus permitting removal of the tray with the impression material from the tooth or other object of which an impression was obtained, without deforming such impression. I have shown the tray with its impression material after thus being removed in Fig. 8. The tray may then be closed and held in this position if desired by again attaching the handle B, so that the two halves of the impression made by the tooth G will again be brought together to form a mold for casting.

The form of tray shown in Figs. 5 and 6 is especially adapted for obtaining the impression of a tooth that cannot readily be inserted into the tray from the single open side. The tongues 14 lying in a plane with the sides 6, 6, result in the tray having two open sides so that, if necessary, it may be placed over a tooth by means of endwise movement.

This tool is of great practical utility, and has no complicated parts to get out of order. Changes may be made in the shape or arrangement of the parts without departing from the principle of my invention, and therefore I do not desire to have my invention limited or restricted to the form illustrated and described, excepting as set forth in the claims.

I claim as my invention:

1. A dental tray composed of two hinged halves adapted to be held in their closed position by means of a removable handle, said handle having a slot adapted to engage the hinge joining the two halves.

2. A dental tray formed of two hinged halves each of said halves having an inwardly projecting tongue.

3. A dental tray formed of two hinged halves adapted to be held in their closed position by means of a removable handle, each of said halves having an inwardly projecting tongue.

4. A dental tray composed of a cup shaped member with two parts hinged together, each of said parts having an inwardly projecting tongue and a detachable handle adapted to hold said parts together in their closed position when attached.

5. A dental tray having two cup shaped members hinged together, a portion of the top wall of each member being bent to function as part of the hinge and a parting flange extending inwardly from each of said top walls.

6. A dental tray having two cup shaped members hinged together, each member having a top, a side and two end walls, and flanges extending inwardly from the proximate edges of the end walls.

In testimony that I claim the foregoing as my invention I affix my signature, in the presence of two witnesses, this 14th day of May, 1920.

FINIS E. ROACH.

Witnesses:
B. L. MACGREGOR,
TAYLOR E. BROWN.